(No Model.)
M. OEFINGER.
HOLDER FOR SOAP CAKES.
No. 487,094. Patented Nov. 29, 1892.
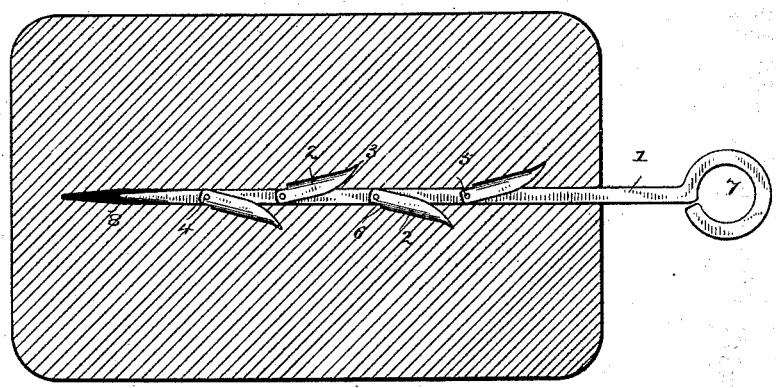
Fig. 1.
Fig. 4.
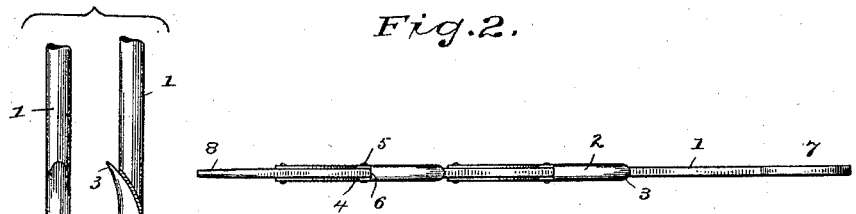
Fig. 2.
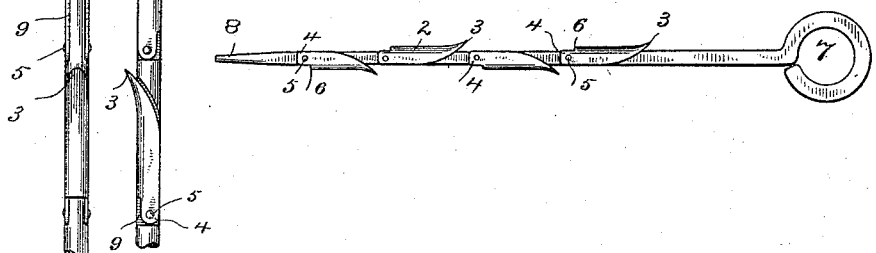
Fig. 3.
WITNESSES
H. A. Lamb
Edith J. Ely.
INVENTOR
Michael Oefinger
By H. M. Wooster atty.

UNITED STATES PATENT OFFICE.

MICHAEL OEFINGER, OF BRIDGEPORT, CONNECTICUT.

HOLDER FOR SOAP CAKES.

SPECIFICATION forming part of Letters Patent No. 487,094, dated November 29, 1892.

Application filed December 19, 1891. Serial No. 415,625. (No model.)

*To all whom it may concern:*

Be it known that I, MICHAEL OEFINGER, a citizen of the United States, residing at Bridgeport, in the county of Fairfield and State of Connecticut, have invented certain new and useful Improvements in Holders for Soap Cakes; and I do hereby declare the following to be a full, clear, and exact description of the invention, such as will enable others skilled in the art to which it appertains to make and use the same.

My invention has for its object to provide a device of this class adapted to be attached to a chain for use in hotels, railway-trains, &c., and which when inserted in a cake of soap will remain in place, holding the soap firmly, until the latter is worn away in use. With these ends in view I have devised the simple and novel soap-holder of which the following description, in connection with the accompanying drawings, is a specification, numbers being used to designate the parts.

Figure 1 is a section of a cake of soap, representing my novel holder in place therein. Figs. 2 and 3 are respectively edge and side views of the holder detached, and Fig. 4 illustrates both in edge and side view a form embodying slight changes in the details of construction.

I am well aware that soap-holders have heretofore been made which were molded in the cake of soap in the process of manufacture, each cake of soap requiring that a holder be molded therein and the holder being useless when the soap was used up, and also that holders have been made which inclosed the cake of soap. The first cost of my novel soap-holders is but little, if any, greater than the first cost of the devices which are molded into the cakes. My improved soap-holders, however, are sold as articles of manufacture independently of the cakes of soap, and a single holder will last for an indefinite length of time, it being simply necessary to insert it into a new cake when the old one is used up.

1 denotes a shank, which is provided with one or more pivoted wings 2. These wings may be made of any preferred shape. I preferably, however, form them from sheet metal and curve them so as to partially inclose the shank when in the closed position, the outer ends being curved outward slightly, as at 3, so that any pull upon the shank will tend to throw them farther out, the inner ends of said wings being provided with ears 4, by which they are pivoted to the shank, the ears being preferably made on both sides of the wings and pivots 5 extending through both wings and the shank, as clearly shown in the drawings. Between the ears the metal of the wings is preferably left to form shoulders 6, which serve as stops to check the movement of the wings when at right angles to the shank should attempt be made to withdraw the holder from the soap. I have shown the shank as provided with a ring 7 for the attachment of a chain. If preferred, the shank may be provided with a swivel also. The inner end of the shank is preferably sharpened slightly, as at 8, to facilitate its insertion into a cake of soap. In Fig. 4 I have illustrated a form in which the shank is made round and is provided on opposite sides with recesses 9 to receive the sides of the wings. This construction renders it somewhat easier to insert the holder into a cake of soap; but as the wings open out in the same manner it is equally as hard to withdraw as the other form. In this form the backs of the ears engage the walls of recesses 9 when the rings are thrown out at right angles to the shank and stop their movement, so that the holder cannot be withdrawn from the cake under ordinary circumstances.

The operation is as follows: The wings are folded inward against the shank, as shown in Figs. 3 and 4, and the holder is forced into a cake of soap from the end. After the holder has been forced in far enough it is given a slight pull backward, the effect of which is to turn the wings outward slightly, as shown in Fig. 1, the curved outer ends of the wings acting to throw them outward so long as the pull is continued and until the downward movement of the wings is limited by the stops. As a matter of fact in use it is impossible either to rotate the holder within the soap or to withdraw it therefrom by any power likely to be applied. Having once inserted the holder in a cake of soap it will remain there until the soap is worn away. The holder may then be used in another cake of soap the same as before. The user is thus required to purchase but one holder and can use it for an unlimited length of time and in connection with any kind of soap which he may prefer.

Having thus described my invention, I claim—

A soap-holder comprising a shank having recesses in its sides receiving wings of sheet metal, which lie flush with the shank when closed, but have curved points projecting beyond the sides of the shank, said wings having ears pivoted to the shank, and a shoulder between said ears to abut against the shank when the wings are wide open, substantially as described.

In testimony whereof I affix my signature in presence of two witnesses.

MICHAEL OEFINGER.

Witnesses:
A. M. WOOSTER,
EDITH G. ELY.